(12) United States Patent
Jang et al.

(10) Patent No.: US 7,317,709 B2
(45) Date of Patent: Jan. 8, 2008

(54) METHOD FOR FAST HANDOVER

(75) Inventors: Hee-jin Jang, Yongin-si (KR); Youn-hee Han, Guri-si (KR); Xiaoyu Liu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 11/291,892

(22) Filed: Dec. 2, 2005

(65) Prior Publication Data
US 2006/0146752 A1  Jul. 6, 2006

(30) Foreign Application Priority Data
Jan. 5, 2005  (KR)  ............... 10-2005-0000742

(51) Int. Cl.
*H04Q 7/00* (2006.01)

(52) U.S. Cl. .............. 370/331; 370/310; 370/328; 370/329; 370/352; 370/252; 370/389; 370/338; 455/442; 455/435.1; 455/436

(58) Field of Classification Search ............ 370/310, 370/331, 328, 338, 329, 352, 252, 394
See application file for complete search history.

(56) References Cited

U.S. PATENT DOCUMENTS

| | | | |
|---|---|---|---|
| 6,721,566 B2 * | 4/2004 | Longoni et al. ............ 455/436 |
| 6,738,362 B1 * | 5/2004 | Xu et al. ................. 370/329 |
| 6,741,575 B1 * | 5/2004 | Zhang et al. ............. 370/329 |
| 6,795,705 B1 * | 9/2004 | Warrier et al. .......... 455/435.1 |
| 6,888,803 B1 * | 5/2005 | Gentry et al. ............ 370/259 |
| 6,907,016 B2 * | 6/2005 | Madour et al. ........... 370/331 |
| 6,922,404 B1 * | 7/2005 | Narayanan et al. ........ 370/338 |
| 7,046,647 B2 * | 5/2006 | Oba et al. ............... 370/331 |
| 7,046,992 B2 * | 5/2006 | Wallentin et al. ......... 455/411 |
| 7,065,067 B2 * | 6/2006 | Song et al. .............. 370/338 |
| 7,068,624 B1 * | 6/2006 | Dantu et al. ............. 370/331 |
| 7,079,521 B2 * | 7/2006 | Holur et al. ............. 370/338 |
| 7,116,668 B2 * | 10/2006 | Sivalingham ............. 370/394 |
| 7,173,932 B2 * | 2/2007 | Miki et al. .............. 370/389 |

FOREIGN PATENT DOCUMENTS

| KR | 2001-0001928 A | 1/2001 |
|---|---|---|
| KR | 2002-00935459 A | 12/2002 |

* cited by examiner

*Primary Examiner*—Marceau Milord
(74) *Attorney, Agent, or Firm*—Sughrue Mion, Pllc.

(57) ABSTRACT

Disclosed is a method for fast handover in a wireless security data communication environment. The fast handover method for a mobile node connected to a network via an access point to perform a data communication in a wireless communication environment according to the present invention includes: performing an authentication while communicating with an authentication server having registration information about the mobile node via an uncontrolled port of the access point so as to make the mobile node connected to the network; performing a mobile Internet Protocol (IP) registration for binding a Care-of-Address (CoA) to a home agent and a correspondent node (CN) via the access point in parallel with performing the authentication; and opening a control port of the access point and relaying data transceived at the mobile node using the CoA when the authentication and the registration being successfully completed. Accordingly, a fast handover of the mobile node can be supported.

17 Claims, 8 Drawing Sheets

METHOD FOR FAST HANDOVER

CROSS-REFERENCE TO RELATED APPLICATIONS

This application claims priority, under 35 U.S.C. § 119, from Korean Patent Application No. 2005-00742, filed on Jan. 5, 2005, the entire content of which is incorporated herein by reference.

BACKGROUND OF THE INVENTION

1. Field of the Invention

Apparatuses and methods consistent with the present invention relate to a fast handover method, and in particular, to a fast handover method performing a wireless authentication for security in parallel with a mobile Internet Protocol (IP) registration at handover in a wireless communication environment.

2. Description of the Related Art

In recent years, the number of wireless Internet users using the mobile IP (MIP) is increasing because of rapid spread of the Internet, development of wireless communication technologies, and enhanced performance of mobile terminals such as portable computers, Personal Digital Assistants (PDAs) and so forth. A mobile terminal under a wireless Internet environment frequently moves to change its network connection location. Such a mobile terminal is referred to as a mobile node.

In addition, Internet service providers (ISP's) have built a next-generation internet network as a wired and wireless integrated network by interworking an existing wired Internet network with a Wireless Local Area Network (WLAN) for providing an Internet service using MIPs, and has thus tried to provide Internet services having fast speed such as electronic mail (E-mail), electronic commerce, Voice over IP (VoIP) and so forth as well as mobility.

However, due to the broadcasting property of WLAN technologies, it is required to improve measures against security vulnerability to ensure wireless data privacy, so that an Institute of Electrical and Electronics Engineers (IEEE) 802.1x standard has been proposed as a next-generation WLAN security technology.

The IEEE 802.1x is a port access protocol seeking security by controlling a network access in response to presence or absence of an authentication via an uncontrolled port as a virtual port. That is, when a mobile node is authenticated for a network access via an uncontrolled port of the IEEE 802.1x, a communication is permitted via a controlled port as a virtual port in an access point, but when the a mobile node is not authenticated, the communication via the control port is interrupted.

According to the IEEE 802.1x, when a supplicant requests an authentication from an authenticator for a network access, the authenticator receives a user credential from the supplicant to perform an authentication on an authentication server.

The supplicant is client equipment which requires a secured network access and includes a mobile terminal such as a laptop or a PDA, and the authenticator is intermediate equipment such as a wireless access point or a network switch. In addition, the authentication server is a server which performs network authentication using its user database or an external user database.

The authenticator is requested an authentication by the supplicant and subsequently requests an authentication service from the authentication server using a received user credential. The authenticator manages a connection port state of a corresponding user, and sets the port to an authentication state or a non-authentication state in response to an authentication result of the authentication server.

When the port is set to the authentication state, the mobile node as the supplicant performs communication using an address for the wireless Internet communication in the corresponding network. However, when the mobile node moves to a foreign network other than its home network, an address used in the home network, that is, the home address cannot be used because the mobile node is now in a corresponding foreign network.

Accordingly, in order to perform a communication in a foreign network using the home address in accordance with the Internet Engineering Task Force (IETF) Mobile IPv4/Mobile IPv6, a binding procedure in which an home agent in the home network is notified of a New Care of Address (NCoA) allocated from the foreign network along with the home address must be carried out. Hereinafter, such a binding procedure is referred to as an MIP registration.

Accordingly, the mobile node can communicate with a correspondent node (CN) using its home address via the home agent as a router having its registration information even when it moves to a foreign network.

Figure 1:
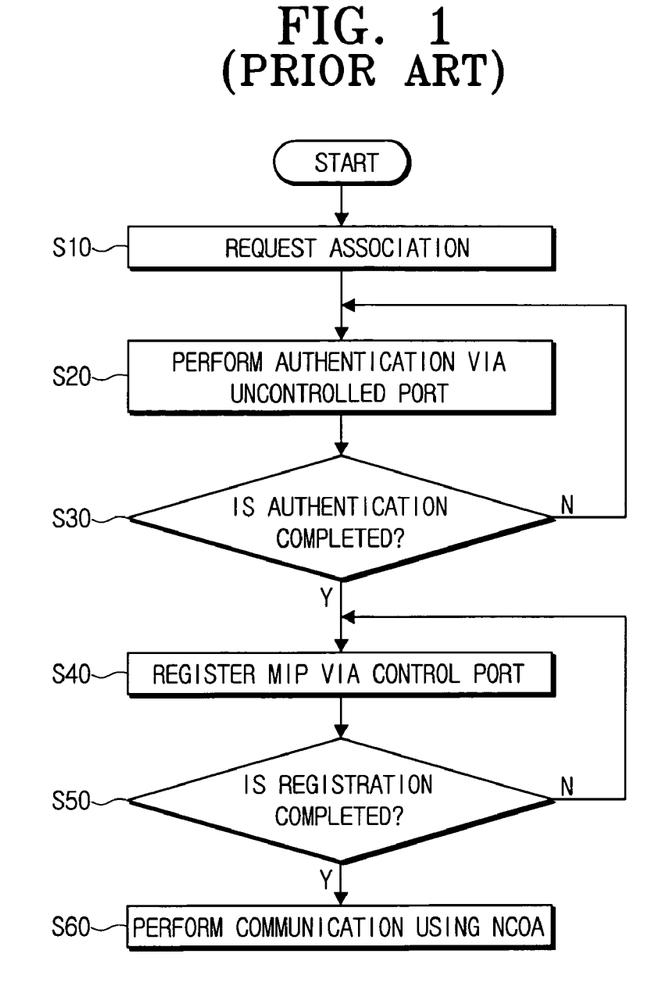
FIG. 1 is a flowchart for explaining a general handover procedure in accordance with an IEEE 802.1x.

FIG. 1 is a flowchart for explaining a general handover procedure in compliance with the IEEE 802.1x.

A mobile node as a supplicant connects to a foreign network where an access point as an authenticator is connected, and requests a connection to the network by transmitting an association request message for performing a communication (S10).

Accordingly, the access point communicates with the mobile node via an uncontrolled port, and performs an authentication by receiving user credential information for the mobile node and transmitting it to the authentication server (S20).

The authentication server receives an authentication request for the mobile node as the supplicant from the access point as the authenticator, and to this end, must have in advance credential information of the mobile node.

The IEEE 802.1x defines a general authentication mechanism among the supplicant, the authenticator, and the authentication server, and defines use of an extensible authentication protocol (EAP) at a media access control (MAC) layer between the supplicant and the authenticator.

The authentication server checks whether the supplicant is a user registered in a corresponding ISP in response to the received credential information, and notifies the authenticator of the authentication result.

When the authentication is successfully completed in response to the authentication result notified from the authentication server (S30), the authenticator opens a control port to permit a communication.

However, even when the communication is permitted in accordance with the IEEE 802.1x protocol, a home address cannot be used for a general data communication as described above when the supplicant is connected to a foreign network other than a home network, so that the supplicant should perform a binding procedure, that is, an MIP registration in which an NCoA allocated from the foreign network via the control port as well as the home address are bound to the home agent of the home network and a CN (S40).

When the MIP registration is completed (S50), the supplicant performs a data communication with the CN via the home agent using the NCoA (S60).

As described above, a delay time taken for the authentication, which is carried out according to the new address obtained from movement of the supplicant, and the binding update, which is carried out before the Internet service is normally resumed, is referred to as a handoff, and the supplicant cannot perform a general data communication during the handoff, so that a great amount of packets is lost.

The authentication procedure of the IEEE 802.1x is very complicated and requires as long a time as one second in completing the authentication of the supplicant. In addition, additional time is spent until the MIP registration is carried out in order to provide a service by means of the NCoA after the authentication is completed.

Accordingly, a series of the complex procedure for the authentication and the MIP registration causes a handoff to be delayed and resultant packets to be lost, and in particular, a seamless service for a real time transmission cannot be ensured to cause degradation of service quality, thereby creating a problem in supporting fast speed mobility of the mobile node.

SUMMARY OF THE INVENTION

It is therefore one aspect of the present invention to provide a method of ensuring data safety in a wireless communication environment while minimizing its resultant delay time to minimize a handover time of the mobile node.

According to another aspect of the present invention, there is provided a fast handover method for a mobile node connected to a network via an access point to perform a data communication in a wireless communication environment, which includes: performing an authentication while communicating with an authentication server having registration information about the mobile node via an uncontrolled port of the access point so as to make the mobile node connected to the network; performing an MIP registration for binding a CoA to a home agent and a CN via the access point in parallel with a start of performing the authentication; and opening a control port of the access point and relaying data transceived at the mobile node using the CoA if the authentication and the MIP registration are successfully completed.

Performing the MIP registration may be carried out via a mobility port logically independent from the uncontrolled port of the access point.

In addition, the access point may perform one of the authentication and the mobile IP registration using one of the uncontrolled port and the mobility port in response to information indicated in a type field of a received packet.

The packet may be transceived via the mobility port of the access point in compliance with an IEEE 802.1x standard if the MIP registration is carried out in response to the information of the packet.

In addition, the access point may open the control port if the authentication becomes successful, and relay a data communication with a new CN using the CoA of the mobile node even if the MIP registration is not completed.

And the access point may interrupt the data communication of the mobile node by disabling the control port if performing the authentication ends in a failure.

In addition, the access point may disable the control port until performing the authentication becomes successful even if performing the MIP registration is completed.

Further, performing the authentication may be carried out in compliance with an IEEE 802.1x standard.

According to further another aspect of the present invention, there is provided a fast handover method for a mobile node connected to a network via an access point to perform a data communication in a wireless communication environment, which includes: causing the mobile node to request a connection to the network with the access point; in response to the connection request, causing the mobile node to transmit registration information for an authentication via an uncontrolled port of the access point and causing an authentication server having the registration information for the mobile node to perform the authentication; causing the mobile node to perform an MIP registration for binding a CoA of the mobile node to a home agent and a CN via the access point in parallel with performing the authentication; and causing the mobile node to perform a communication on the network using the CoA via a control port of the access point when performing the authentication and the mobile IP registration is successfully completed.

The mobile node may perform the MIP registration via a mobility port logically independent from the uncontrolled port of the access point.

Further, the mobile node may use a type field of a transmitted packet to represent information indicating performing one of the authentication and the mobile IP registration via one of the uncontrolled port and the mobility port.

In addition, the mobile node may query the access point whether the mobility port is supported when requesting the connection.

The mobile node may perform requesting the connection by transmitting to the access point an association message or a reassociation message comprising an information bit representing whether the mobility port is supported.

Further, the information bit may be configured to have a predetermined number of bits in a reserved field of the association message or the reassociation message.

The mobile node may perform a communication with a new CN via the control port of the access point using the CoA of the mobile node, if the authentication is successful and the mobile IP registration is not completed.

The mobile node may perform a new session communication via the control port of the access point using the CoA of the mobile node, if the authentication is successful and the mobile IP registration is not completed. Accordingly, data security can be maintained, a handoff time of the mobile node can be minimized, and a fast handover can be implemented in a wireless environment.

BRIEF DESCRIPTION OF THE DRAWINGS

The above aspects and features of the present invention will be more apparent by describing exemplary embodiments of the present invention with reference to the accompanying drawings, in which.

In the drawings, it should be understood that like reference numerals refer to like feature and structure.

DETAILED DESCRIPTION OF THE EXEMPLARY EMBODIMENTS

Hereinafter, the present invention will be described in detail with reference to the accompanying drawings.

Figure 2:
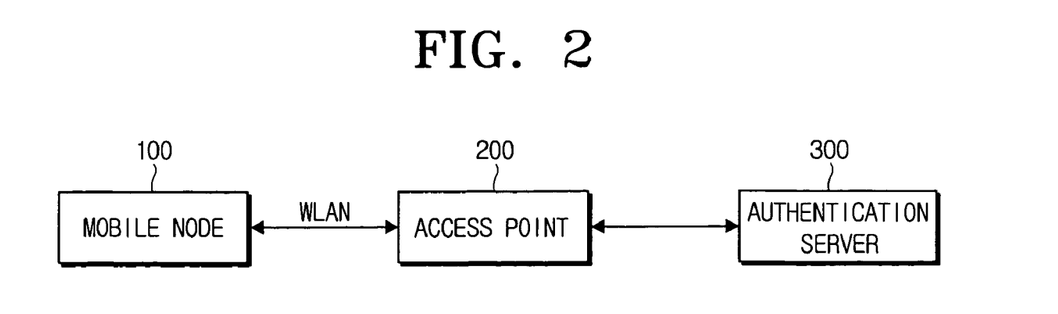
FIG. 2 is a view for explaining a fast handover method in accordance with the present invention.

FIG. 2 is a view for explaining a fast handover method in accordance with the present invention.

Referring to the same drawing, a mobile node 100 as a supplicant is connected to an access point 200 via a WLAN and requests an access to a network where the access point 200 is connected, and the access point 200 as an authenticator communicates with an authentication server 300 via an uncontrolled port to perform an authentication for the mobile node 100, and performs an MIP registration via a mobility port at the same time. The IEEE 802.1x is exemplified as an authentication protocol in accordance with an embodiment of the present invention, however, the present invention is not limited thereto, and the present embodiment is only an example thereof.

The mobile node 100 is client equipment which requires a secured network access and includes a mobile terminal capable of performing a data communication such as a cellular phone, a notebook computer, or a PDA, and the access point 200 is intermediate equipment having the mobile node 100 connected to the network and relaying a data communication, and acts as an authenticator in the present embodiment. In addition, the authentication server 300 is a server performing a verification whether the mobile node 100 is an authorized user registered in a corresponding service providing company using its own user database or an external user database.

Figure 3:
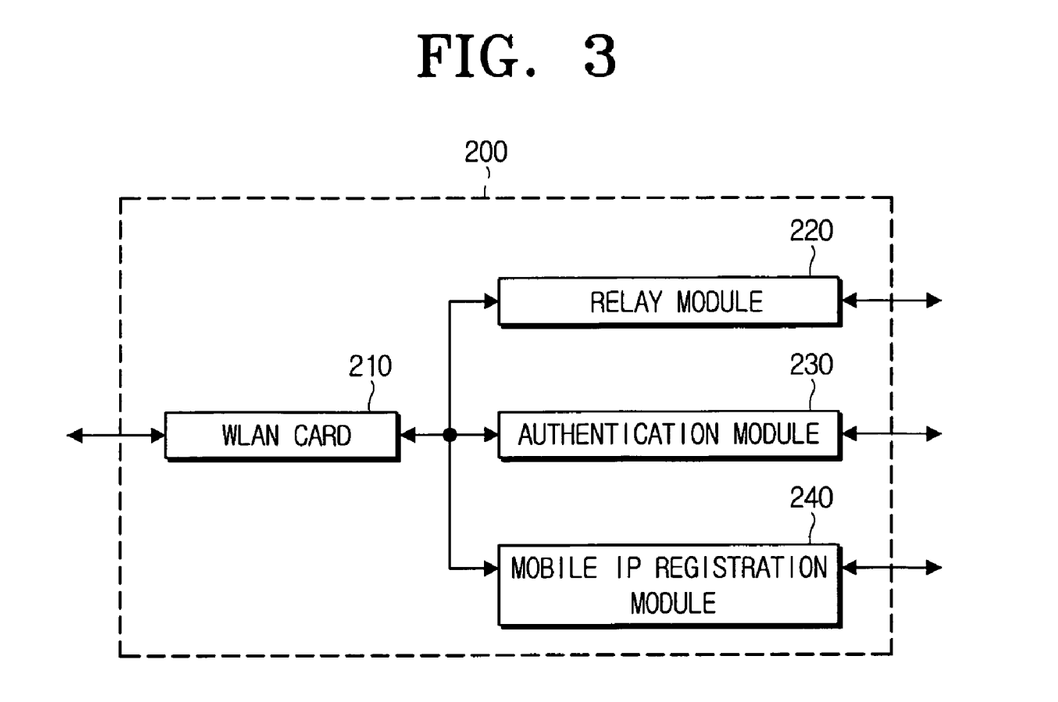
FIG. 3 is a view for explaining an access point in accordance with an exemplary embodiment of the present invention.

FIG. 3 is a view for explaining the access point in accordance with an exemplary embodiment of the present invention.

The access point 200 includes a WLAN card 210, a relay module 220, an authentication module 230, and an MIP registration module 240.

The access point 200 is connected to the mobile node 100 via the WLAN card 210 and performs a data communication.

The relay module 220 relays a data communication between the mobile node 100 and a network via a control port opened upon completion of an authentication. In addition, the authentication module 230 receives credential information for authenticating the mobile node 100 via an uncontrolled port, and requests an authentication for the mobile node 100 by transmitting the credential information to the authentication server 300. Accordingly, if the authentication server 300 authenticates the mobile node 100, the relay module 220 relays a data communication between a CN and the mobile node 100 via the network using the control port, so that the mobile node 100 can be provided with wireless Internet services.

In the meantime, the MIP registration module 240 registers at a home agent a home address and a CoA including prefix information of the network where the mobile node 100 is currently located, and notifies the CN of the result.

All packets transmitted from the mobile node 100 include the CoA, and data packets transmitted to the mobile node 100 is set to be delivered toward the CoA as their destination. To this end, the mobile node 100 registers the CoA in the home agent, and the data packets received at the home address via the Internet network are delivered to the registered CoA address via the home agent to be received by the mobile node 100.

A mobility port is a logical port such as the control port and the uncontrolled port, which is logically separated from the control port and the uncontrolled port.

According to an exemplary embodiment of the present invention, the mobility port transceives messages for a binding update according to a security protocol in compliance with a general mobile IPv6 such as IP Security (IPSec) or Return Routability (RR).

That is, the mobility port, as a separate logical port from the uncontrolled port, and the uncontrolled port are simultaneously opened, and the mobility port performs a data communication according to a separate security protocol and is not used as a typical port for transceiving data packets.

Accordingly, for example, security of data receipt and transmission for a binding update between the mobile node 100 and the home agent, and between the mobile node and the CN is ensured according to the IPSec and RR, respectively.

According to an exemplary embodiment of the present invention, the access point 200 opens the control port if an authentication of the mobile node 100 via the uncontrolled port and an MIP registration via the mobility port are completed, and relays all packets transceived at the mobile node 100 via the control port.

In addition, the access point 200 opens the control port if the authentication is completed in a new network, and may have the mobile node 100 start a data communication with a new CN using an NCoA even if the MIP registration is not completed. However, the mobile node 100 cannot continue a previous communication with an existing CN using an address which has been used for the previous communication before the mobile node 100 moves in the new network. In this case, a seamless communication with the existing CN is reserved for a predetermined time, and the access point 200 can communicate with all CNs if the MIP registration is completed via the mobility port.

In the meantime, the access point 200 opens the control port if the authentication is completed, and may have the mobile node 100 start a data communication with a new CN using an NCoA or a new session communication even if the MIP registration is not completed. In other words, if the authentication succeeds and the MIP registration is not completed, the mobile node does not start the same session communication until the MIP registration is completed. However, the mobile node can start a data communication with a new CN using an NCoA or start a new session communication with the same CN.

However, the control port is not opened in the access point 200 before the authentication via the uncontrolled port is completed even if the MIP registration has been completed in advance via the mobility port.

Figure 5:
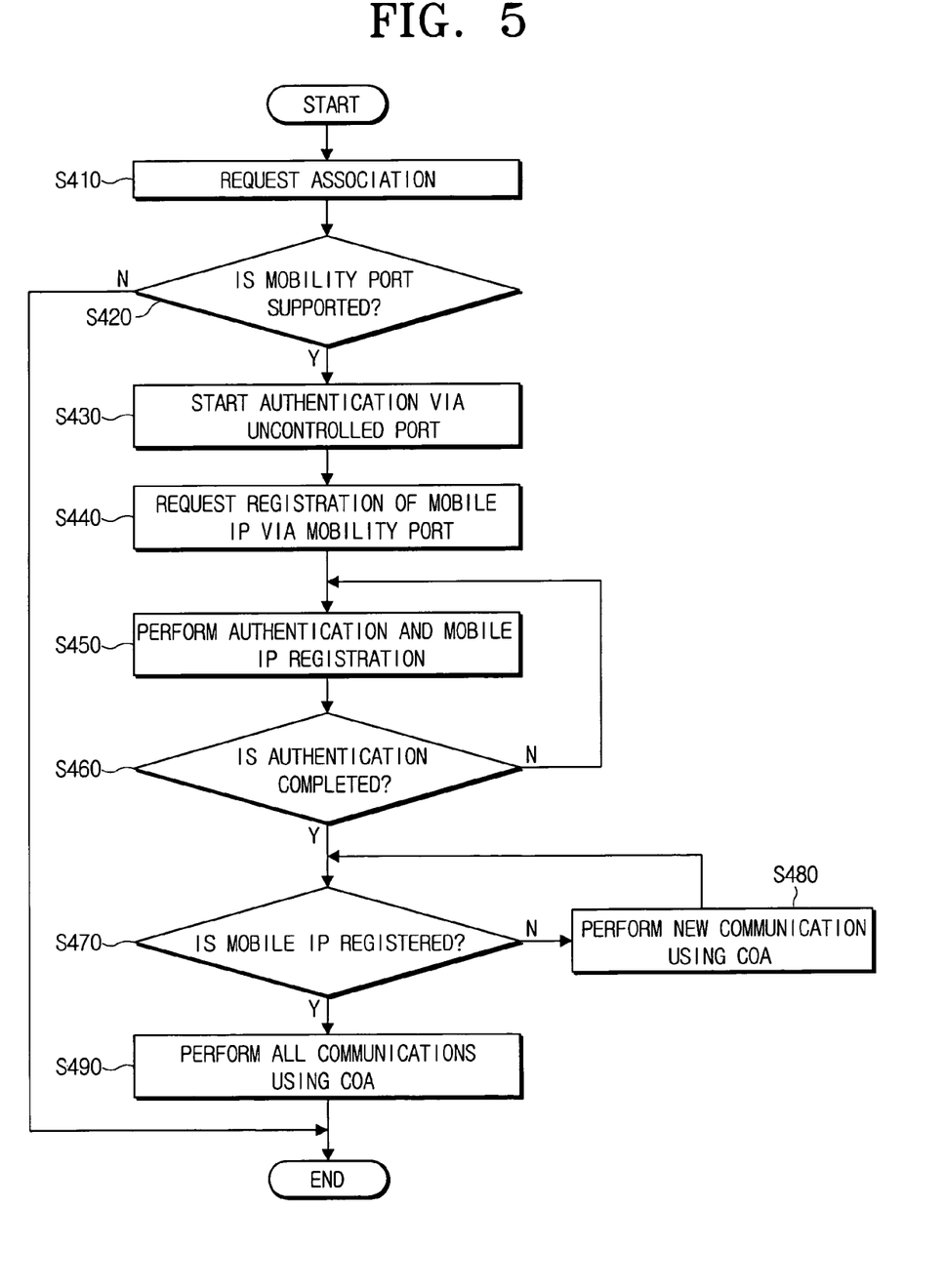
FIG. 5 is a flowchart for explaining a fast handover method in accordance with the present invention.
Figure 6:
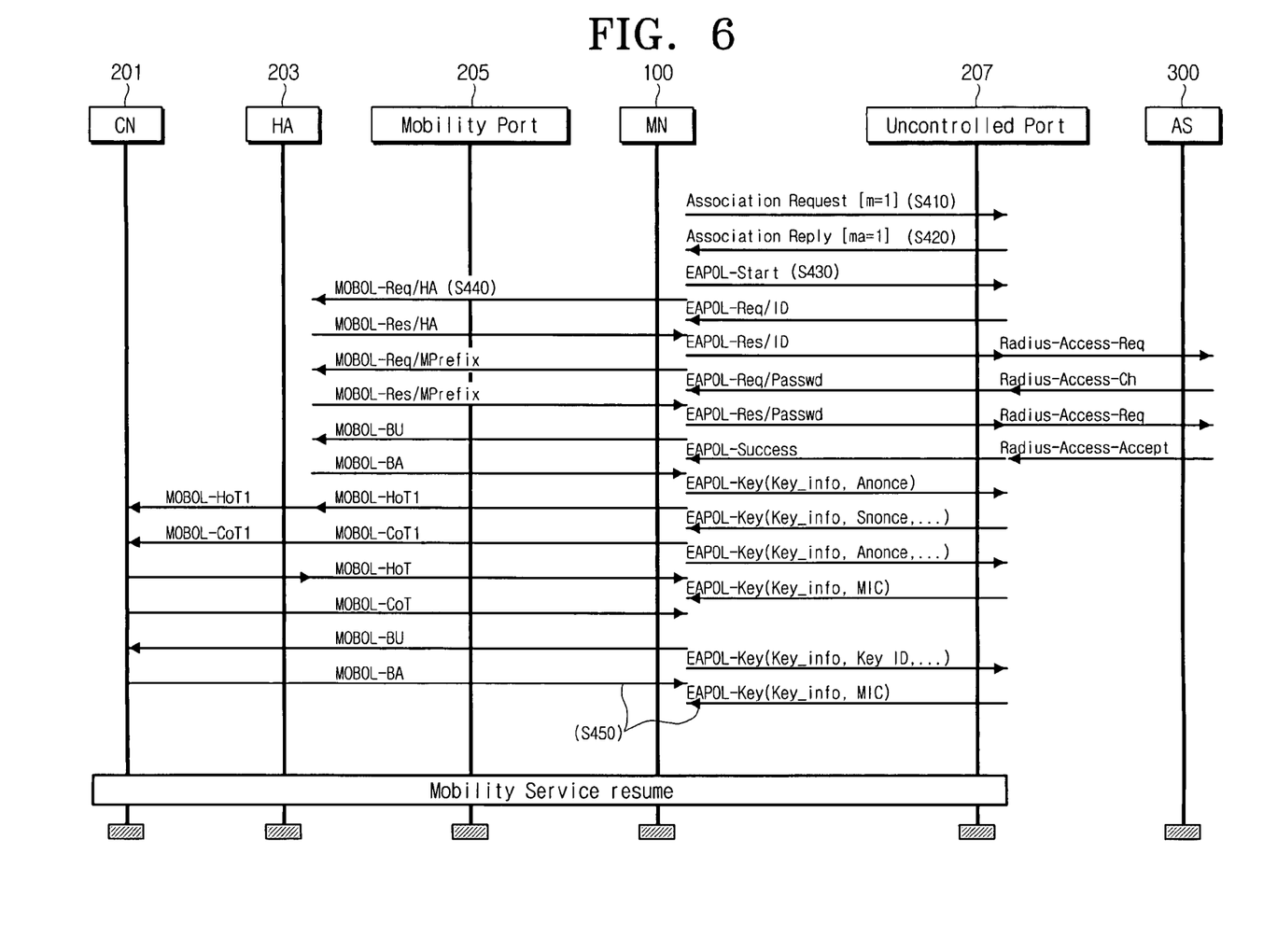
FIG. 6 is a message sequence chart for explaining a fast handover method in accordance with the present invention.

FIG. 5 is a flowchart for explaining a fast handover method in accordance with an exemplary embodiment of the present invention, and FIG. 6 is a message sequence chart for explaining a fast handover method in accordance with the an exemplary embodiment of the present invention.

According to the fast handover method of the exemplary embodiment of the present invention, the mobile node 100 first requests an association to the access point 200 via an uncontrolled port 207 for connection to a network (S410).

The association request is carried out by having the mobile node 100 newly turned on to be connected to the network for the first time and transmit an association request message to the access point 200, or having the mobile node 100 move to the network and transmit a reassociation request message to the access point 200.

The association or reassociation request message is one which requests that the control port be opened so as to make the mobile node 100 transceive general data packets via a network.

Figure 4A:
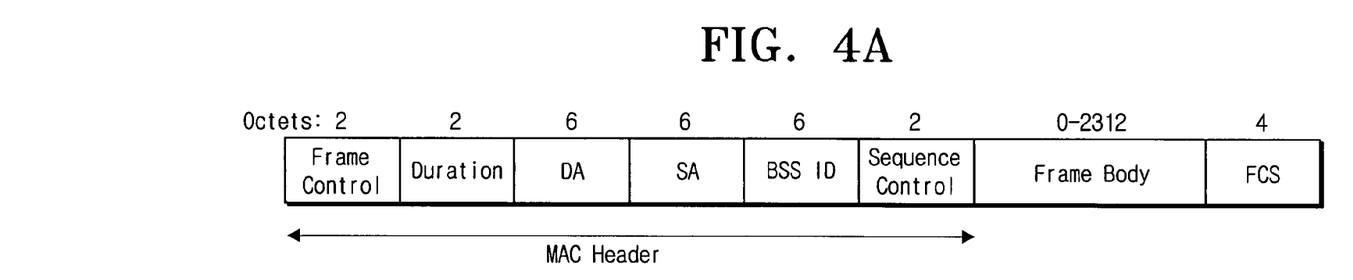
FIGS. 4A to 4F are views illustrating a structure of a packet transmitted by a fast handover method in accordance with an exemplary embodiment of the present invention.
Figure 4B:
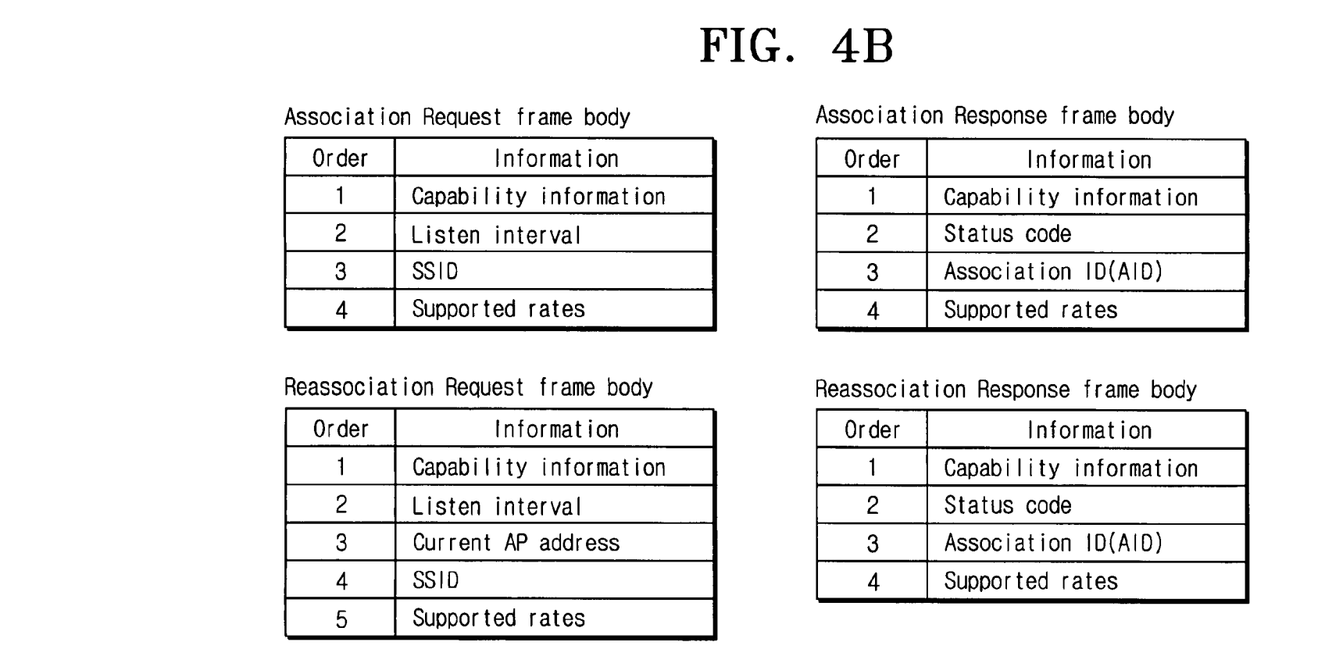
Figure 4C:
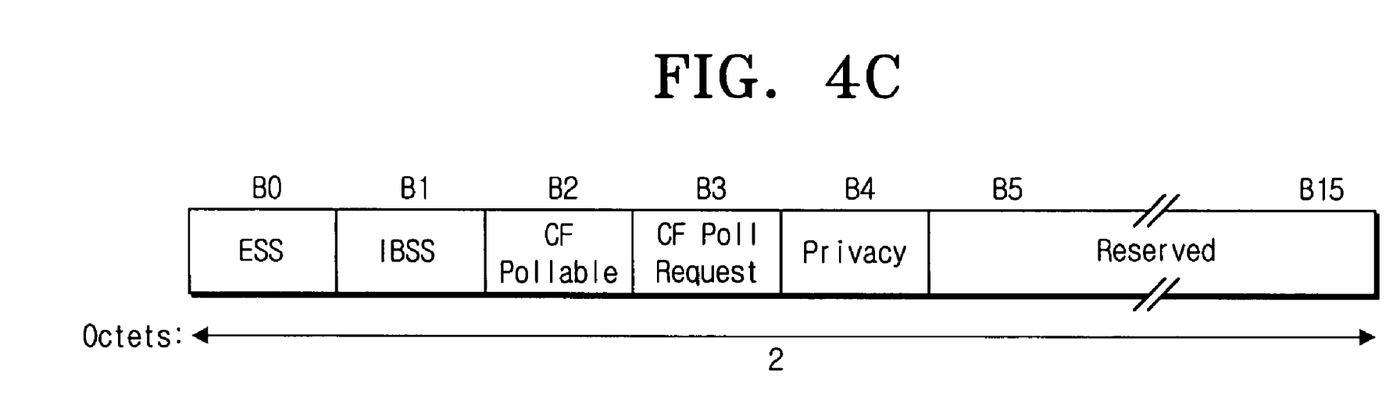

FIGS. 4A to 4C are views illustrating a packet structure for the association request message and its response.

According to the IEEE 802.11, the packet is divided into a management frame, a control frame, and a data frame, and FIG. 4A shows a format of the management frame. The association request message, the reassociation request message, an association response message, and a reassociation response message belong to the management frame.

A frame body part of the management frame shown in FIG. 4A comprises four tables different from one another as shown in FIG. 4B according to kinds of message.

In addition, each table constituting the frame body includes a capability information field.

FIG. 4C shows a capability information field included in each table constituting the frame body. Referring to the same drawing, the capability information field includes a reserved field.

Figure 4D:
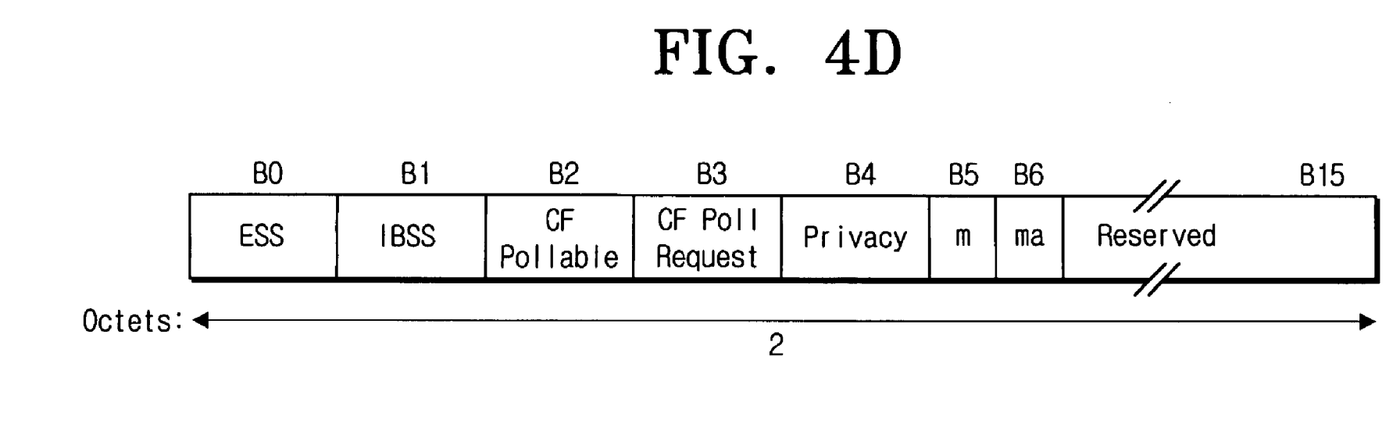

Referring to FIG. 4D, an "m" bit and an "ma" bit are used as two bits of the reserved field part of the capability information field shown in FIG. 4C for confirming whether a mobility port 205 according to an exemplary embodiment of the present invention is supported.

If the mobile node 100 supports the mobility port 205 according to an exemplary embodiment of the present invention, the "m" bit is set to "1" and the "ma" bit to "0," and an association or reassociation request message is transmitted to the access point 200.

The access point 200, upon receipt of the association or reassociation request message having "m=1" and "ma=0," confirms whether it supports the mobility port 205 (S420), and if it supports the mobility port 205, it sets the "m" bit to "0" and the "ma" bit to "1"0 and transmits them to the mobile node 100 in a reserved field of the capability information field in a frame body of an association or reassociation response message.

The access point 200, upon receipt of the association or reassociation request from the mobile node 100, performs an authentication in compliance with the IEEE 802.1x via the uncontrolled port 207 (S430).

In addition, if the mobile node 100 receives the association or reassociation response message in which the "m" bit is set to "0" and the "ma" bit is set to "1" in the capability information field, the mobile node transmits the CoA, as a temporary address of a corresponding network, and a binding request message including a home address (MOBOL-REQ/HA) to the access point 200 via the mobility port 205, thereby requesting an MIP registration (S440).

Accordingly, the access point 200 performs an authentication on the mobile node 100 while communicating with the authentication server 300 via the uncontrolled port 207, and performs the MIP registration in parallel with the authentication while communicating with the mobile node 100, a home agent 203, and a CN 201 via the mobility port 205 (S450).

The access point 200 determines whether the authentication of the mobile node 100 is completed via the uncontrolled port 207 (S460), and, in case of determination that the authentication is not completed, has the uncontrolled port 207 maintained in a standby mode for receiving an authentication completion message (Radius-Access-Accept) from the authentication server 300, but does not open the control port.

If the access point 200 receives the Radius-Access-Accept from the authentication server 300 via the uncontrolled port 207, it determines whether the MIP registration is completed via the mobility port 205 (S470).

The access point 200 opens the control port in a state of a completed authentication even if the MIP registration is not completed, and the mobile node 100 can start a new communication using the CoA even if the MIP registration is not completed (S480). However, the mobile node 100 cannot continue communicating with an existing CN which has used the address before the mobile node moves in the corresponding network. If the MIP registration ends in a failure, the access point 200 may try to perform the MIP registration via the mobility port 205 for certain times.

In the meantime, the access point 200 opens the control port if the authentication is completed, and may have the mobile node 100 start a data communication with a new CN using an NCoA or a new session communication even if the MIP registration is not completed. If the authentication succeeds and the MIP registration is not completed, the mobile node does not start the same session communication until the MIP registration is completed. However, the mobile node can start a data communication with a new CN using an NCoA or start a new session communication with the same CN.

If the MIP registration is completed via the mobility port 205, the access point 200 opens the control port, relays all typical data packets transceived in the mobile node 100 via the control port (S490).

In the meantime, the control port is not opened before the authentication is completed via the uncontrolled port 207 even if the MIP registration is completed in advance via the mobility port 205 in the access point 200, and a typical data communication cannot be performed via the control port.

Figure 4E:
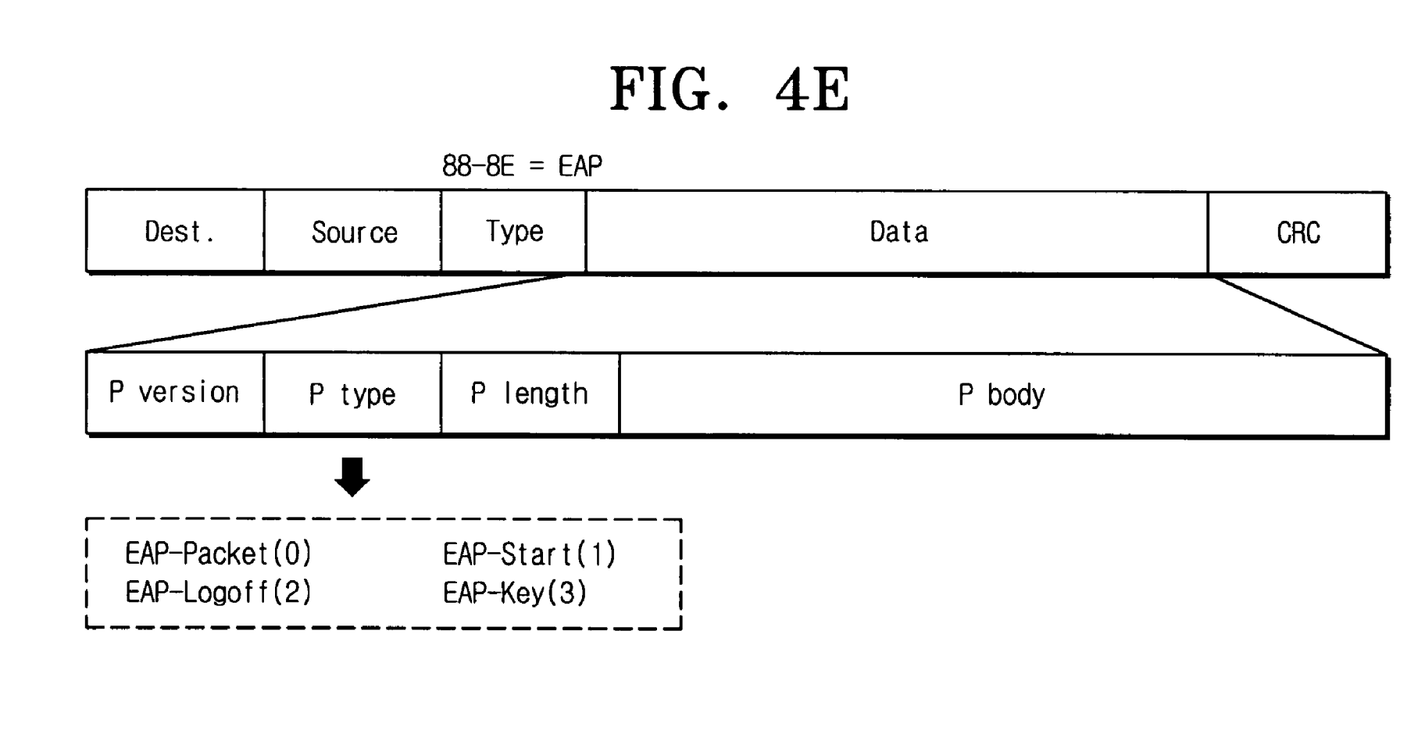
Figure 4F:
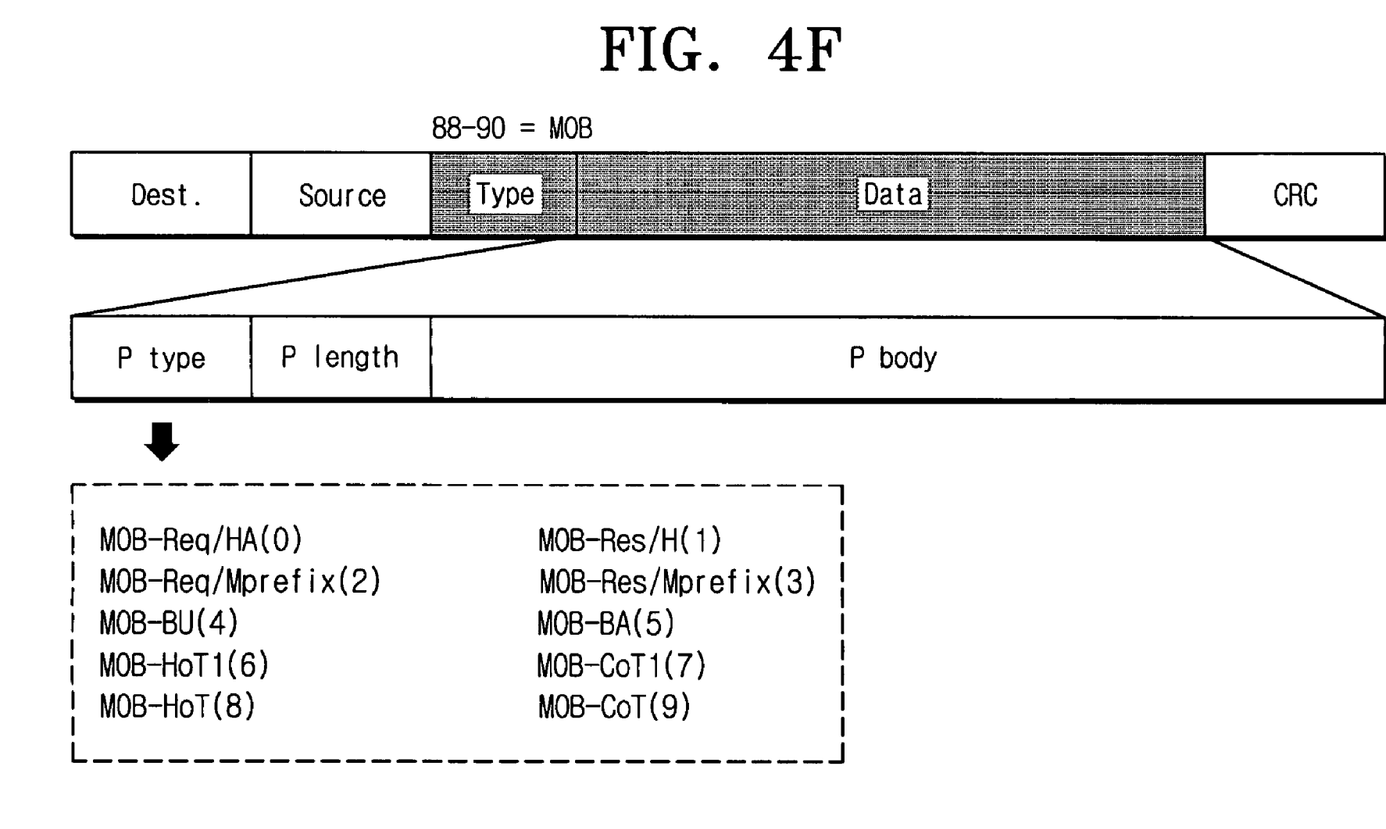

FIG. 4E shows a format of a packet transmitted via the uncontrolled port 207, and FIG. 4F is a view illustrating a structure of a packet transmitted via the mobility port 205 according to an exemplary embodiment of the present invention.

Referring to FIG. 4E, in order to represent a packet as transmitted for an authentication, for example, type fields of the packet may be used such that EAP-Start=1 as an authentication start request, EAP-Logoff=2 as an authentication failure, and EAP-Key=3 as a key included in a message for the authentication are used.

In addition, referring to FIG. 4F, in order to represent a packet as transmitted for an MIP registration, for example, type fields of the packet may be used such that MOB-Res/HA=1 as an MIP registration response message from the home agent 203, MOB-Req/Mprefix=2, MOB=Res/Mprefix=3, MOB-BU=4, MOB-BA=5 as a message exchanged for binding to the home agent 203, and MOB=HoTI=6, MOB-HoTI=7, MOB-HoT=8, and MOB-CoT=9 as a message exchanged for binding to the CN 201 are used.

FIG. 6 illustrates a detailed flow of messages transceived between the mobile node 100, the access point 200 and the authentication server 300 via the uncontrolled port 207, and messages transceived between the mobile node 100, the access point 200, the home agent 203 and the CN 201 via the mobility port 205.

When the mobile node 100 moves to a new network to cause a temporary address CoA to be changed, it transmits an association request message to the access point 200. The access point 200 responds to the association request message of the mobile node 100, and transmits to the mobile node 100 an association response message indicating whether the mobility port 205 is supported. Accordingly, if the mobility port 205 is supported, the mobile node 100 transmits an Extensible Authentication Protocol over LAN (EAPOL)-Start message to the access point 200 for receiving data packets at the new CoA. The EAPOL-Start message, which indicates that the mobile node 100 having the changed CoA starts a series of procedures for receiving an authentication via the uncontrolled port 207, is notified to the access point 200. Upon start of the authentication procedure via the uncontrolled port 207, packets are simultaneously exchanged between the mobile node 100, the home agent, and the CN 201 via the mobility port 205 through the access point 200 for an MIP registration. The authentication for the mobile node 100 and the MIP registration for the mobile node 100 are simultaneously performed in parallel via separate logical ports, respectively.

Packet exchanges between the mobile node 100, the access point 200 and the authentication server 300 for an authentication for the mobile node 100 having a new CoA are carried out as follows.

The mobile node 100 which has received the association response message from the authentication module 230 performing a communication via the uncontrolled port 207 of the access point 200 enters into the authentication procedure by transmitting an EAPOL-Start message to the authentication module 230. The EAPOL is one type of authentication protocols used in LANs and the EAPOL-Start message indicates start of the authentication for the mobile node 100.

The authentication module 230 which has received the EAPOL-Start message from the mobile node 100 transmits an EAPOL-Req/ID message to the mobile node 100 which requests an ID of the mobile node 100 necessary for the authentication. The EAPOL-Req/ID message is a message. Accordingly, the mobile node 100 responds to the ID request by transmitting an EAPOL-Res/ID including the ID of the mobile node 100 to the authentication module 230. The ID of the mobile node 100 included in the EAPOL-Res/ID which is transmitted to the authentication module 230 by the mobile node 100 is an ID of a user registered in a service providing company providing the authentication server 300.

The authentication module 230 receives the EAPOL-Res/ID message from the mobile node 100 to check the ID of the mobile node 100, and transmits a Radius-Access-Req message including the confirmed ID to the authentication server 300. Accordingly, the authentication server 300 checks if the ID included in the EAPOL-Res/ID message is an ID of a user registered in the corresponding service providing company. If it corresponds to the ID of the registered user, the authentication server 300 transmits a Radius-Access-Ch message accepting the authentication request to the authentication module 230, and the authentication module 230 thus transmits to the mobile node 100 an EAPOL-Req/Passwd message requesting that a password corresponding to the ID of the mobile node 100 be transmitted to the mobile node 100.

Subsequently, the mobile node 100 transmits an EAPOL-Res/Passwd message including the password to the authentication module 230. The authentication module 230 which has received the EAPOL-Res/Passwd message from the mobile node 100 transmits a Radius-Access-Req message including the received password to the authentication server 300.

The authentication server 300 stores IDs of registered users and passwords corresponding to the respective IDs in its own database or an external database. Accordingly, the authentication server 300 determines whether the mobile node 100 is an effectively registered user according to the received ID and password of the mobile node 100.

If the mobile node 100 is an effectively registered user, the authentication server 300 transmits to the authentication module 230 a Radius-Access-Accept message which indicates that the authentication for connection to the network is completed.

Accordingly, the authentication for the mobile node 100 performed in the authentication server 300 is completed, and the authentication module 230 transmits an EAPOL-Success message indicating an authentication success to the mobile node 100. The mobile node 100 which has received the EAPOL-Success message exchanges dynamic keys generated by transceiving EAPOL-Key messages with the authentication module 230.

In the meantime, the packet exchange for the MIP registration is performed among the mobile node 100, the MIP registration module 240 of the access point 200, the home agent 203, and the CN 201 through the mobility port 205 and also simultaneously performed in parallel with the authentication procedure.

The mobile node 100, which has received the association response message from the authentication module 230, while transmitting the EAPOL-Start message for the authentication via the uncontrolled port 207, transmits a MOBOL-Req/HA message requesting the MIP registration to the MIP registration module 240 so as to be transmitted to the home agent 203 via the mobility port 205.

Accordingly, the packet exchange via the mobility port 205 is initiated. The home agent 203 which has received the MOBOL-Req/HA message transmits as its response a MOBOL-Res/HA message to the mobile node 100. Accordingly, the mobile node 100 transmits a MOBOL-Req/MPrefix indicating the changed CoA to the home agent 203, and the home agent 203 transmits as its response a MOBOL-Res/MPrefix message to the mobile node 100.

In addition, the mobile node 100 transmits a MOBOL-BU message querying a binding update to the home agent 203, and the home agent 203 transmits a MOBOL-BA message indicating completion of the binding update to the mobile node 100, thereby completing the binding update for the home agent 203.

Subsequently, the mobile node 100 performs a safe binding update for the CN 201 by transmitting a MOBOL-HoTI message to the CN 201 via the home agent 203 and directly transmitting a MOBOL-CoTI message to the CN 201.

Accordingly, the CN 201 transmits a MOBOL-HoT message permitting the binding update to the mobile node 100 via the home agent 203, and directly transmits a MOBOL-CoT message to the mobile node 100.

And the mobile node 100 transmits a MOBOL-BU message querying the binding update to the CN 201, and the CN 201 transmits the MOBOL-BA message indicating the binding update to the mobile node 100.

Accordingly, the binding update of the new CoA of the mobile node to the home agent 203 and the CN 201 is completed.

If the authentication and the MIP registration are simultaneously carried out in parallel via separate logical ports, respectively, the MIP registration can be performed for a time taken for the authentication, so that the handoff time for the MIP registration can be prevented from being delayed even after the authentication is completed, thereby significantly reducing the handover time.

Unlike the networks transmitting wireless data distributed in several areas, the number of the authentication server 300 is as small as one or two per the corresponding service providing company, so that it is general to receive all of the authentication requests transmitted from the authenticator and perform the authentication. Accordingly, the time taken for the authentication procedure is actually significant.

According to an exemplary embodiment of the present invention, an MIP registration can be performed via a separate logical port in parallel with an authentication procedure, irrespective of presence or absence of the authentication, so that that time taken for a handover can be significantly reduced.

In addition, time spent by the access point 200 for transceiving data with the authentication server 300 while the authentication procedure is carried out is relatively short, and the access point 200 is in a standby mode for the authentication at the authentication server 300 during most of the authentication procedure, so that idle resources of the access point 200 in a standby mode can be used for the MIP registration via the mobility port 205, thereby enhancing utilization of the resources.

According to the exemplary embodiment of the present invention as described above, authentication of the mobile node is performed to ensure a safe data exchange in a wireless environment while the MIP registration is performed in parallel with the authentication for the delay time caused by the authentication procedure, so that the handoff time of the mobile node can be minimized and a fast handover can be implemented.

In addition, the MIP registration can be performed in parallel with the authentication by introducing the mobility port logically independent from the uncontrolled port, thereby effectively utilizing idle resources in the access point.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A fast handover method for a mobile node connected to a network via an access point to perform a data communication in a wireless communication environment, comprising:
    performing an authentication while communicating with an authentication server having registration information about the mobile node via an uncontrolled port of the access point;
    performing a mobile Internet Protocol (IP) registration for binding a Care-of-Address (CoA) to a home agent and a correspondent node (CN) via the access point in parallel with performing the authentication; and
    opening a control port of the access point and relaying data transceived at the mobile node using the CoA if the authentication and the mobile IP registration are successfully completed.

2. The fast handover method according to claim 1, wherein performing the mobile IP registration is carried out via a mobility port logically independent from the uncontrolled port of the access point.

3. The fast handover method according to claim 2, wherein the access point performs one of the authentication and the mobile IP registration using one of the uncontrolled port and the mobility port in response to information indicated in a type field of a received packet.

4. The fast handover method according to claim 3, wherein the packet is transceived via the mobility port of the access point in compliance with an Institute of Electrical and Electronics Engineers (IEEE) 802.1x standard if the mobile IP registration is carried out in response to the information of the packet.

5. The fast handover method according to claim 1, wherein the access point opens the control port if the authentication becomes successful, and relays a data communication with a new correspondent node (CN) using the CoA of the mobile node even if the mobile IP registration is not completed.

6. The fast handover method according to claim 1, wherein the access point interrupts the data communication of the mobile node by disabling the control port if performing the authentication ends in a failure.

7. The fast handover method according to claim 1, wherein the access point disables the control port until performing the authentication becomes successful even if performing the mobile IP registration is completed.

8. The fast handover method according to claim 1, wherein performing the authentication is carried out in compliance with an IEEE 802.1x standard.

9. A fast handover method for a mobile node connected to a network via an access point to perform a data communication in a wireless communication environment, comprising:
    causing the mobile node to request a connection to the network with the access point;
    in response to the connection request, causing the mobile node to transmit registration information for an authentication via an uncontrolled port of the access point and causing an authentication server having the registration information for the mobile node to perform the authentication;
    causing the mobile node to perform a mobile Internet Protocol (IP) registration for binding a Care-of-Address (CoA) of the mobile node to a home agent and a correspondent node (CN) via the access point in parallel with performing the authentication; and
    causing the mobile node to perform a communication on the network using the CoA via a control port of the access point if performing the authentication and the mobile IP registration are successfully completed.

10. The fast handover method according to claim 9, wherein the mobile node performs the mobile IP registration via a mobility port logically independent from the uncontrolled port of the access point.

11. The fast handover method according to claim 10, wherein the mobile node uses a type field of a transmitted packet to represent information indicating performing one of the authentication and the mobile IP registration via one of the uncontrolled port and the mobility port.

12. The fast handover method according to claim 10, wherein the mobile node queries the access point whether the mobility port is supported when requesting the connection.

13. The fast handover method according to claim 12, wherein the mobile node performs requesting the connection by transmitting to the access point an association message or a reassociation message comprising an information bit representing whether the mobility port is supported.

14. The fast handover method according to claim 13, wherein the information bit is configured to have a predetermined number of bits in a reserved field of the association message or the reassociation message.

15. The fast handover method according to claim 9, wherein the mobile node performs a communication with a new CN via the control port of the access point using the CoA of the mobile node, if the authentication is successful and the mobile IP registration is not completed.

16. The fast handover method according to claim 9, wherein performing the authentication is carried out in compliance with an Institute of Electrical and Electronics Engineers (IEEE) 802.1x standard.

17. The fast handover method according to claim 9, wherein the mobile node performs a new session communication via the control port of the access point using the CoA of the mobile node, if the authentication is successful and the mobile IP registration is not completed.

* * * * *